No. 769,575. PATENTED SEPT. 6, 1904.
E. VLADESCU.
CORN HUSKER.
APPLICATION FILED FEB. 27, 1904.
NO MODEL.

WITNESSES
E. W. Collins
Walter Abbz

INVENTOR
Emilie Vladescu

BY
Howson and Howson
HER ATTORNEYS

No. 769,575. Patented September 6, 1904.

UNITED STATES PATENT OFFICE.

EMILIE VLADESCU, OF GARA NUCET, ROUMANIA.

CORN-HUSKER.

SPECIFICATION forming part of Letters Patent No. 769,575, dated September 6, 1904.

Application filed February 27, 1904. Serial No. 195,650. (No model.)

*To all whom it may concern:*

Be it known that I, EMILIE VLADESCU, born THIESS, general's widow, a subject of the King of Roumania, and a resident of Gara Nucet, Kingdom of Roumania, have invented a certain new and useful Improved Corn-Husker, of which the following is a full, clear, and exact description of the invention, such as will enable others skilled in the art to make and use the same.

The present invention has for its object an apparatus by means of which the leaves surrounding the ears of maize may be quickly and easily removed.

In the arrangements known up to the present, in which the leaves surrounding the ears of maize are cut through near to the stem by means of a cylindrical cutting-tool and afterward separated from the lower portion of the ear by a special stripping apparatus, the arrangement of the stripper, which is movably joined to the cutting-tool and capable of being adjusted according to the size of the ear, does not properly fulfil its object, because for different sizes of ears of maize there would be also, owing to the different thicknesses of the stems, corresponding and adjustable cylindrical cutting-tools for taking hold of the stems.

In the present invention the cutting and stripping tools connected with each other have been fixed rigidly to one tool-head, so that by exchanging the tool-heads, which are fastened in any suitable known manner to the driving-shaft, tools may be used which correspond to the size of the maize-ears. This tool-head is surrounded by a safety-guard which prevents the hand of the laborer coming in contact with the tools when feeding the ears.

Figure 1:
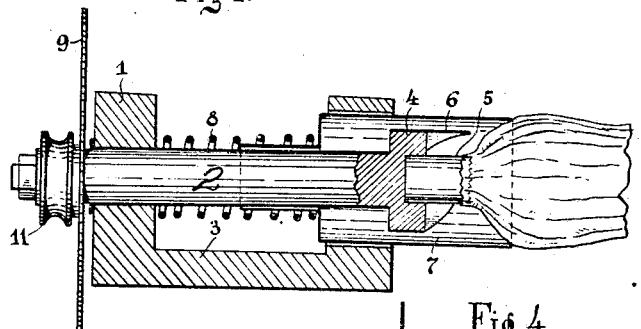
Figure 2:
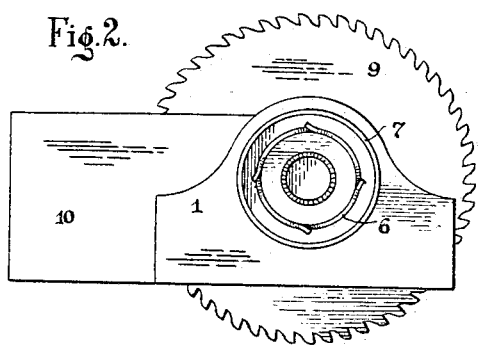
Figure 3:
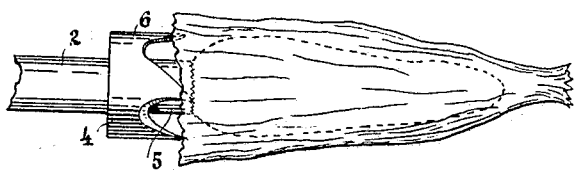

In the accompanying drawings, Figure 1 is a section of the apparatus according to the present invention. Fig. 2 is an end view of the apparatus shown in Fig. 1. Fig. 3 shows the action of the stripper upon the leaves of the maize, and Fig. 4 is a sectional view of a modification.

In the frame 1 of the apparatus the shaft 2 is reposing in the box 3. At one end of the shaft there is fixed, combined with it in any suitable manner, the head 4, carrying the tools. In the center of this latter there is fixed a cylinder 5, provided at its end with saw-teeth, while at the circular edge of the head 4 there are fixed the large teeth 6, which may be of any suitable shape and form the stripper. In order to prevent the hand of the laborer coming in contact with the rotating tools and for the guiding of the maize-ear fed into the apparatus, a cylinder 7 is provided, surrounding the head 4, which reposes in the frame 1 and slides freely on the box 3, being kept in its position surrounding the tool-head by means of a spring 8, which at the one side has its support at the frame 1 and acts in opposition to the feed direction of the ear. At the other end of the shaft 2 there is a circular saw 9, by means of which the maize-stems are being cut off from the maize-ears fed into the apparatus on the frame 1, which in that part has been shaped into the guide 10.

The driving of the pulley 11, fixed onto the shaft 2, may be effected in any suitable manner, either by treadle, lever-driving, motor-driving, or the like.

Figure 4:
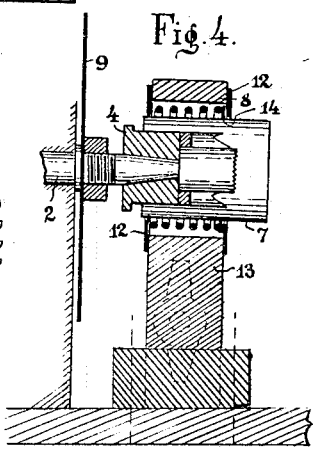

In the mode of execution shown in Fig. 4 the end of the shaft 2 is conical and the tool-head 4 is pressed on the same. The cylinder surrounding the tool-head 7 is arranged in a support 13, which can by known means be moved and fixed at pleasure in the frame of the apparatus in such a manner that it reposes on two plates 12, which close up the bore of the support, the diameter of which is larger than that of the cylinder 7. An annular shoulder 14 of the cylinder 7 and the spring, which on one side is supported by this shoulder and on the other side by one of the plates 12, are endeavoring to keep the cylinder in its proper position.

The action of the apparatus is as follows: The ear of the maize is in the first place fed onto the guide 10 of the circular saw and is there cut off at the stem. After this the ear is fed into the cylinder 7 and pressed against the cylinder-saw 5, which cuts through all the leaves. The teeth of the stripper now seize the cut leaves, detach them from the ear, and throw them against the inner wall of the cylinder 7. When afterward the leaf-covering is withdrawn with the maize-ear, the latter drops out of the former.

I claim—

1. A corn-husker, comprising a revolving tool-head, a cutting-tool and a concentric leaves-loosening tool both mounted on said tool-head, a protecting-cylinder surrounding said tools, a support adapted to receive said cylinder in its bore, and a spring to normally hold the cylinder in position surrounding the tools.

2. In an apparatus for freeing the maize-ear from its surrounding leaves the combination of a revolving tool-head, a leaves-cutting tool and a leaves-loosening tool, concentric to and rigidly secured to such tool-head, a protecting-cylinder surrounding the latter, a spring holding such cylinder in its proper position, a support adapted to receive in its bore the protecting-cylinder and the spring, plates adapted to close up the bore of such support and a shoulder on the protecting-cylinder adapted to repose against one of the plates, the spring being interposed between the other plate and the shoulder.

In testimony whereof I have signed my name to this specification in the presence of two subscribing witnesses.

EMILIE (VEUVE GENERAL) VLADESCU.

Witnesses:
A. ROSENSTEIN,
Z. NADLER.